United States Patent [19]

Dublin, Jr. et al.

[11] Patent Number: 5,202,681
[45] Date of Patent: Apr. 13, 1993

[54] INTEGRAL TRANSDUCER HOUSING AND METHOD

[75] Inventors: Wilbur L. Dublin, Jr., 308 Texas Ave., Ste. 104, Round Rock, Tex. 78664; Boyd B. Moore, Houston, Tex.

[73] Assignee: Wilbur L. Dublin, Jr.

[21] Appl. No.: 831,623

[22] Filed: Feb. 6, 1992

Related U.S. Application Data

[63] Continuation of Ser. No. 496,657, Mar. 21, 1990, abandoned.

[51] Int. Cl.$^5$ .............................................. G01V 1/00
[52] U.S. Cl. .................................. 340/856.4; 73/151
[58] Field of Search ............ 367/81; 340/853.7, 854.9, 340/856.3, 856.4, 853, 855.2, 855.6; 73/720, 721, 151, 153, 155, 760, 778, 802, 820

[56] References Cited

U.S. PATENT DOCUMENTS 3,186,222 6/1965 Martin .................................. 340/853
4,739,325 4/1988 MacLeod ............................ 340/854

Primary Examiner—Brian S. Steinberger
Attorney, Agent, or Firm—Arnold, White & Durkee

[57] ABSTRACT

A housing with a fluid flow bore is provided with an integral diaphragm forming a cavity within the housing to position the diaphragm adjacent the bore, for receiving sensors thereon to receive intelligence from the housing indicative of any one or all of a plurality of physical functions related to strain in the housing such as by way of example, pressure of fluid in the bore of the housing, axial load, torsion, shear or bending and communicate or transmit the intelligence of such functions to a predetermined location. Where desired, the cavity may be precharged with an inert gas to inhibit damage to the sensors and to serve as a reference pressure. The cavity and transducer therein are isolated from ambient conditions externally of the housing. A flow conduit may be connected at each end of the housing to conduct fluid to the housing bore. Where necessary the intelligence relating to the function or functions may be compensated for temperature or second order effects related to any or all of the functions.

5 Claims, 1 Drawing Sheet

INTEGRAL TRANSDUCER HOUSING AND METHOD

This application is a continuation of application Ser. No. 07/496,657, filed Mar. 21, 1990 now abandoned.

STATEMENT OF THE PRIOR ART

Various arrangements have been proposed and used for positioning a sensor, such as a strain gage, to transmit intelligence.

In some prior art arrangements a port is provided in the bore of the support or housing which communicates fluid in the housing bore with a side pocket associated with the support or housing side pocket which has a transducer positioned therein to reflect intelligence, such as pressure, of the fluid flowing through the housing bore. This arrangement may be unsatisfactory or present problems in that the intersection of the side pocket port with the housing bore tends to create eddy currents in the flow occurring through the housing so as to interfere with the proper functioning of the transducer, or the accuracy thereof. Also, fluid flow through the housing creates eddy currents at the intersection of the side pocket port with the bore in the housing and may cause a build up of precipitated solids at the port. This in turn may expedite or increase the eddy current effect which in turn may cause substance to be deposited more quickly at the intersection of the side pocket port with the bore of the housing so as to eventually completely clog communication of the housing bore with the side pocket and the transducer therein.

The problem is further complicated in that the transducer may be positioned so that it is relatively inaccessible such as in a flow line in a process system that may be located on a tower or other elevated or relatively inaccessible structure. In other situations, the transducer may be positioned internally of some other type of arrangement or device, or may be positioned in the flow line of a conduit such as a submerged or buried pipe line or in the flow string of an oil, gas or other type subterranean well employed for recovering substances from the earth. It can be appreciated that anything which interferes with the proper functioning of the transducer to properly reflect and transmit intelligence from the transducer to a desired location, such as instrumentation or intelligence receiving means at the earth's surface or adjacent the housing is undesirable in that the inaccessibility will generally substantially increase the cost of maintaining or replacing the housing and the transducer for transmitting intelligence from fluid flow through the housing, and may interfere with or unnecessarily decrease flow through the housing or support.

It can also be appreciated that where the transducer is mounted within a housing bore, its presence may also create problems similar to those described above.

The prior art discloses the use of a thin wall tube with strain gages thereon, but where such devices are employed in flow conduits such as in process plants, pipe lines, well bore flow strings and the like, the tube must be enclosed and sealed in a support or housing. The presence of the seals along with the use of dissimilar materials in any form of transducer support that is non-integral may create problems or interference with the signal, either by triboelectric effect or other effects, that is created and transmitted from the strain gage.

SUMMARY OF THE PRESENT INVENTION

The present invention overcomes the above and other problems associated with the use of a transducer in that it provides a housing which has an integral diaphragm formed therewith for receiving strain gages for transmitting intelligence from the housing to a predetermined or remote location.

Yet another object of the present invention is to provide a housing with an integral diaphragm thereon for receiving strain gages to form a transducer for receiving and transmitting intelligence representing any one or more functions of fluid pressure in the housing, axial load, torsion, shear and bending of the housing which in turn may be indicative of any one or more of fluid pressure, axial load, torsion, shear and bending of a tubular member such as a well bore flow string, pipe line or the like with which the housing is connected.

Still another object of the present invention is to provide a housing or support for a transducer to position the transducer immediately adjacent but not in flow contact with the bore extending through the housing or support for transmitting intelligence from fluid flow through the housing to a remote location.

A further object of the present invention is to provide a housing with an integral thin wall section forming a diaphragm immediately adjacent the bore through the housing which bore is uninterrupted and continuous to eliminate anomalies in the flow occurring through the bore that might otherwise create false or incorrect intelligence transmitted by strain gages mounted on the integral housing thin wall section.

The present invention provides a housing or support for a transducer to position the transducer immediately adjacent, but not in flow contact with the bore extending through the support of the housing for transmitting intelligence from the fluid to a remote location.

The bore of the housing is uninterrupted and is smooth which aids in providing a more accurate transmission of the desired intelligence to be obtained from the transducer for transmission to a predetermined location.

The housing or support is constructed and arranged so that ready access may be had to the transducer when desired or necessary for repair or replacement or adjustment thereof or repositioning within the cavity provided in the housing for receiving the transducer while maintaining the sensor isolated from the fluid in the housing bore and isolated from ambient conditions externally of the housing during use. The housing also may be constructed and arranged in any suitable manner for transmitting the intelligence by electrical leads, or any optical or laser means as may be desired.

Another object is to provide a diaphragm which is not of uniform thickness for receiving sensors to provide a transducer for receiving and transmitting.

Another object is to provide an inert gas to serve as a reference pressure to preload an integral diaphragm formed in a closed housing cavity.

Another object of the invention is to provide a housing with an integral diaphragm and means to receive and transmit intelligence representative of physical functions such as fluid pressure, axial load, torsion, shear and bending in the housing.

Other objects and advantages will become more readily apparent from a consideration of the following description and drawings wherein:

DESCRIPTION OF THE PREFERRED EMBODIMENTS

Figure 1:
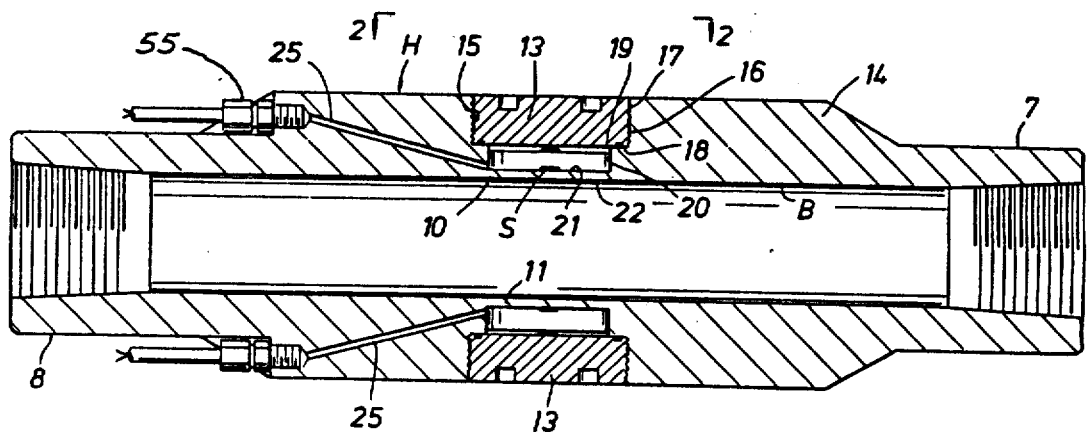
FIG. 1 is a sectional view of a preferred embodiment of the housing or support.

Attention is first directed to FIG. 1 of the drawings wherein a tubular housing represented generally by the letter H is shown having a longitudinal bore B extending therethrough. The housing H may be secured at each end 7 and 8 to a pipe or tubular member, not shown, having a bore therethrough so that the pipe communicates with each end 7 and 8 of the housing to conduct flow through the bore B extending through the housing H.

The housing H includes intermediate its ends at least one and preferably two thin wall sections 10 which forms a diaphragm integral with the housing H; however, any suitable number of diaphragms may be integrally formed and employed, and two diaphragms are illustrated in FIG. 1. The diaphragms are thing in cross-section relative to the thickness of wall 14.

The thin wall sections or diaphragms are formed by cutting, machining or drilling into the wall 14 of housing H to form an opening 15 in the housing H and then forming a plug or closure 13 to be received in the openings 15 and secured therein by any suitable means. The opening 15 is shown as being circular, but it may be any desired configuration and threads may be formed on the annular edge 16 of such circular opening or recess 15 to receive threads 17 formed on the annular edge of the plug 13 for enclosing a transducer or sensor as will be described within the housing wall 14. Suitable sealing means as represented at 27 may be provided to isolate or seal off the cavity and the sensors in the cavity from ambient pressure or from the surrounding conditions in which the housing H is employed. The plug 13 may be provided with recesses as shown, if desired, for engagement by a spanner wrench or the like for ease of removal and placement.

Figure 2:
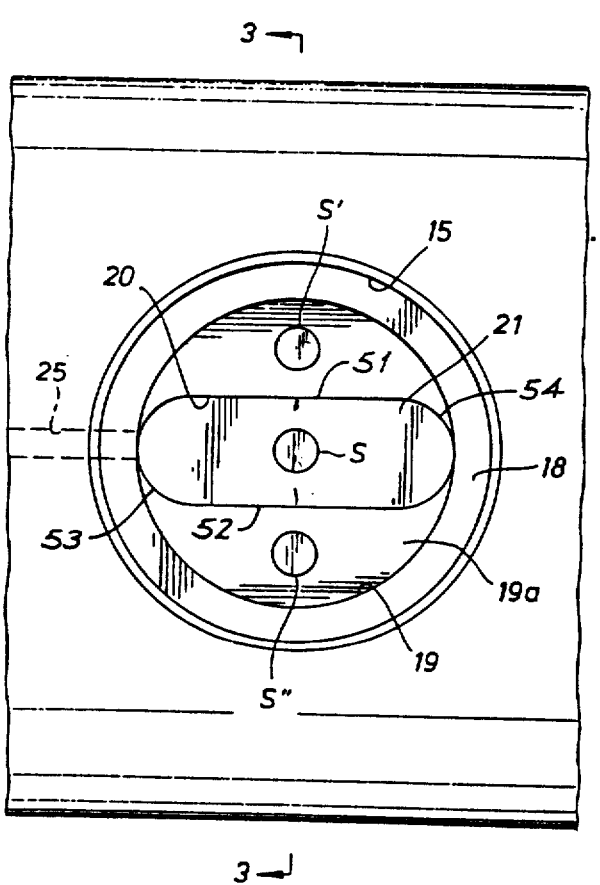
FIG. 2 is a partial elevational view on the line 2—2 of FIG. 1 with a plug portion of the support removed to show one form of cavity or recess to receive a sensor.
Figure 3:
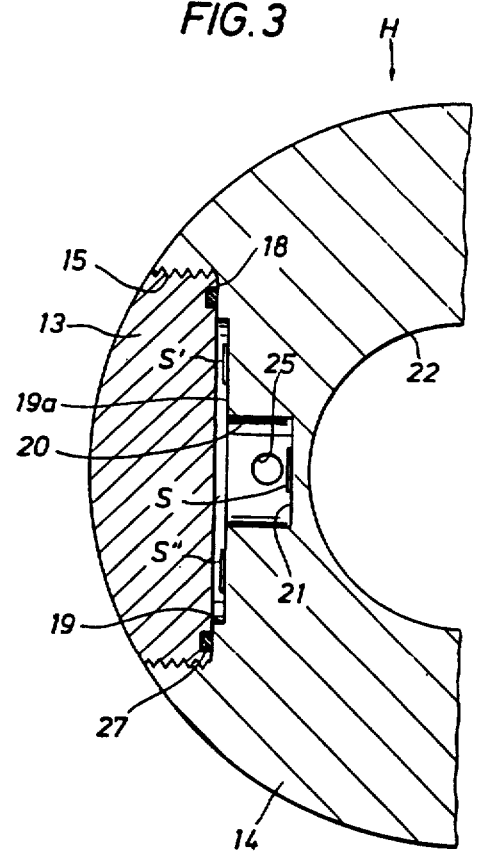
FIG. 3 is a sectional view on the line 3—3 of FIG. 2.

The circular opening 15 terminates in a bottom annular ledge 18 and a smaller diameter circular opening 19 depends from the annular ledge 18 as illustrated in the drawings. A cavity 20 is formed in the bottom surface 19a of the smaller circular cavity 19, such cavity 20 assuming any suitable configuration and as illustrated in FIG. 2 may extend longitudinally of the housing H as shown. The bottom 21 of the cavity 20 is preferably substantially flat as illustrated and terminates in spaced relation circumferentially relative to, but is adjacent the wall 22 of the bore B extending through the housing H to form the thin wall section or diaphragms represented at 10 and 11 which is thin in cross-section relative to the thickness of wall 14 and in non-uniform in its cross-section thickness as seen in cross-section in FIG. 3.

It will be noted that the thin wall section or diaphragms 10, 11 are shown as being extended longitudinally and this configuration is employed where substantial axial loads are present and aid in distributing such loads that may concentrate adjacent the curved ends along the longitudinal extent of such diaphragm. For example, cavity 20 is formed integrally in housing H in FIG. 2 to create an extended central portion between substantially parallel walls 51 and 52 and curved end walls 53, 54.

It can be appreciated that other configurations, such as circular, may be employed for the diaphragm depending upon the type of intelligence that is desired to be indicated by the present invention.

The sensor represented as S is a schematic illustration of an array of strain gages (resistors) that are positioned on the bottom surface 21 of the cavity 20 which array and any suitable means for positioning them are well known in the art. It is preferred that the array of sensors or strain gages be positioned proximate and intermediate the sides 51, 52 of the longitudinal cavity 20.

After the sensors are positioned on the diaphragm 21 of cavity 20, each of the sensors is connected with an electrical conductor that extends through openings 25 in the housing. The closure 13 is then secured in opening 15 and the cavity 20 is charged with an inert gas such as argon by passing the gas through one-way check valve means and through opening 25 in a manner well known. The gas is preloaded or charged to a predetermined pressure range to inhibit damage to the diaphragm when unusual or excessive pressure is encountered in the housing bore. Since the output of the pressure function is proportional to the difference between the pressure in the housing bore B and the pressure in cavity 20, the precharged pressure on the gas in cavity 20 serves as a reference pressure. As temperature changes occur in cavity 20, the variation of reference pressure in the cavity is offset by the temperature sensors S' and S". The assembled unit is then temperature compensated and calibrated for primary function, previously identified herein, to be indicated by each sensor. Cross-talk among all of the sensors is corrected in a well known manner to provide a discrete signal from each sensor that indicates one of the primary functions such as pressure, axial load, as heretofore innumerated.

The assembled unit is then ready to be installed for use in a process line, or any other line or situation where it is desired to be used.

Where it is desired to obtain the function indicative of pressure of fluid in the well bore, it is necessary to have only one cavity 20 and integral diaphragm therein. Where it is desired to obtain any or all of the other functions, it is desirable, and may be necessary, to have at least two integral diaphragms with the sensors thereon arranged, calibrated, connected with the resistors and the other diaphragm or diaphragms in a manner well known in the art to increase the accuracy of the desired function to be measured.

Where it is desired to employ strain gages to measure any one of the functions, the strain gages for other functions will preferably be employed to determine the correction of the desired function. Primary measurements of all functions can then be transmitted to the earth's surface and the information treated in any suitable manner so as to obtain the desired reading.

Whether one function or each function, that is, pressure, axial load, torsion, shear or bending is desired, then the arrangement and connection of the sensors will be accomplished in a manner well known in the art as generally referred to above to determine or measure such information or intelligence in response to flexing or movement of the diaphragm or such information. The accuracy of the measurement of each function is enhanced by correction of cross talk that may occur among the remaining functions.

It can be further appreciated that a microprocessor may be employed in lieu of strain gages to obtain the intelligence or information obtained by the strain gages. Any suitable type of strain gage may be employed, although at the present time the metallic foil strain gages seem to be best for high temperature and long term stability. However, such electrical resistance strain gage as generally referred to herein may be either metallic or a semi-conductor type, and a fiber optic strain gage, quartz or ceramic crystal, capacitance or inductive type strain gage may be employed. Any device that will average strain over a length may be employed as the sensor of the present invention.

In some situations the temperature effect may require determination and consideration to obtain a correct reading of any intelligence received and in such situation additional sensors as represented S' and S" may be mounted on the thicker wall portion 19a of housing H adjacent the cavity 20 to reflect intelligence from temperature and enable such information to be transmitted along with the information from the sensor display represented generally at S to a remote location or to a desired location such as the earth's surface for determining the net effect of the desired information obtained which, in the example herein, is the pressure of fluid flow through the housing H. The temperature information may be integrated with selected strain gages to automatically correct the intelligence being transmitted for temperature differences.

In order to transmit the intelligence obtained from the sensor S, as well as from the sensors S' and S", suitable passage means 25 may be provided in the housing H which communicate with the smaller opening 19 and the cavity 21 as shown in the drawings. Any suitable transmission means such as electrical conduits, optical cable, laser form, or suitable communicating means as schematically illustrated in FIG. 1 of the drawings may be established or connected with each of the sensors to transmit the indication obtained thereby during use to a desired or remote location.

As noted, any suitable form of sensor may be employed in the housing H and may be mounted on the integral diaphragm housing of the present invention in any suitable well known manner to accomplish the results desired. The present invention may be employed to obtain any other desired function related to strain in housing H which a sensor is capable of receiving and transmitting.

It is to be noted that bore B is continuous and uninterrupted so that it provides a smooth bore to not interfere with, or affect fluid flow which might interfere with or affect the intelligence to be received from the fluid and transmitted.

The transducer or sensors may be positioned in any suitably configured cavity, and are positioned on a diaphragm of any suitable configuration to accomplish the results desired. It is preferable that the diaphragm be of suitable thickness not to interfere with the reception by the sensors of the desired intelligence related to strain in housing H, but of sufficient thickness to withstand the pressure of any fluid flow in the housing as well as being isolated or sealed off from the fluid and ambient conditions externally of the housing.

The housing H is shown as having threads adjacent each end for threadedly connecting a pipe therewith. However, the threaded ends could be eliminated. Flanges on each end and a cooperating flange on each pipe end can be provided to be connected with the adjacent housing flange by suitable means such as bolts for ease of removal and replacement such as in process plants can be provided.

In this event the passages 25 would extend from the cavity 20 and instead of extending longitudinally of the housing, they would extend laterally adjacent, but spaced from circular opening 15 to the exterior of housing H for communicating intelligence to any instrument associated with the housing or at a remote or predetermined location.

Where the housing H and transducer in the cavity therein are employed in a well bore having a well head closure adjacent or at the upper end of the well bore at the earth's surface, one communicating means for communicating intelligence from the transducer S may be electrical conductors or electrical cables connected to the sensors employed in cavity 15 in the housing.

In installing the present invention, it is connected in the well flow string to communicate the well flow string at each end of the housing, such connection being effected at the earth's surface. The electrical cables are encased in steel and connected at one end with the transducer in the cavity 20 and the plug or closure 13 sealably positioned in the recess 15. Cable connected to the sensor S in the housing extends through the passages 25 to project therefrom as shown in FIG. 1. The steel encased cable preferably is secured by swedge lock clamping means 55 as shown in FIG. 1, in the ends of openings 25 of housing H, which swedge locks engage or clamp with the encased cables to keep them in place. Additional encased cable can be connected by suitable splicing means well known in the art so that a desired length of cable can be fed into the well bore as the flow string with the housing H connected therein is lowered into position in the well bore. After the pipe has been positioned in the well bore, it is desirable to extend the conductors from the sensor(s) through the well head at the earth's surface. An opening may be provided to receive the cables and in such event the well head is provided with seal means in an opening therethrough to seal off between each of the cables to isolate them from each other in the well head and to isolate them from the well head. Also, swedge lock connectors are provided in the well head to receive each cable separately to secure with the cable and isolate each cable from the other cable as well as isolating each cable from the well head. It will also be appreciated that each cable will be provided with a jacket or armour so that the swedge lock engaged with such rigid armour to retain the armour and the cable enclosed therein in position in the well head and to further aid in isolating and sealing off each cable as it passes through the sealing means from the other cables as well as from the well head. The ends of the cables projecting from the well head are then connected to a suitable monitoring or instrumentation means adjacent the well head or at a remote location if desired.

Suitable conduit is provided which extends to suitable instrumentation or facility, such as an analog indicator, microprocessor or computer for treating the intelligence as desired.

Where the present invention is employed in a process installation such as a chemical plant or the like with the installation above ground, and where electrical cable or conduit is employed as the communicating means, it will be connected to the sensors and extend from the passage 25 and then extended to the monitoring or instrumentation means at any predetermined location as desired and extended to any suitable monitoring or instrumentation means wherever it may be located.

The foregoing disclosure and description of the invention are illustrative and explanatory thereof, and various changes in size, shape and materials as well as in the details of the illustrated construction may be made without departing from the spirit of the invention.

What is claimed is:

1. A transducer assembly having a longitudinal bore therethrough and adapted to be connected at each end with a conduit, said assembly comprising:
    a housing;
    a chamber formed in the housing and having a bottom surface adjacent the bore of the assembly;
    a recessed diaphragm integrally formed in the bottom surface of the chamber, said diaphragm extending longitudinally within said chamber;
    at least one sensor positioned on said diaphragm and adapted for producing a first signal in response to strain induced in the diaphragm;
    means for transmitting said signal from the sensor to a predetermined location remote from said assembly; and
    a second sensor attached to the bottom surface of the chamber and spaced from said diaphragm, said second sensor adapted for producing a second signal in response to strain induced in said bottom surface whereby the first and second signals are provided to permit remote analysis of physical conditions proximate the assembly.

2. The transducer assembly of claim 1 wherein said chamber includes an access port opening to the exterior surface of the housing and a closure to be received in the access port and secured therein.

3. The transducer assembly of claim 1 wherein said means for transmitting said signal include electrical conductors associated with said sensor; and electrical conduits attached to said housing and adapted for receiving said electrical conductors, said conduits connected between said housing and said predetermined location.

4. The transducer assembly of claim 1 further including a means to preload said chamber to a predetermined pressure range.

5. The transducer assembly of claim 1 wherein said means for transmitting said signal include electrical conductors associated with said sensor; and electrical conduits attached to said housing and adapted for receiving said electrical conductors, said conduits connected between said housing and said predetermined location.

* * * * *